United States Patent [19]

Verkuylen

[11] Patent Number: 4,732,244
[45] Date of Patent: Mar. 22, 1988

[54] HYDRAULIC SHOCK DAMPER ASSEMBLY FOR USE IN VEHICLES

[75] Inventor: Adrianus H. I. Verkuylen, Malden, Netherlands

[73] Assignee: White Power Production B.V., Netherlands

[21] Appl. No.: 7,376

[22] Filed: Jan. 27, 1987

[30] Foreign Application Priority Data

Jan. 30, 1986 [NL] Netherlands .......................... 8600211

[51] Int. Cl.⁴ ............................ F16F 9/03; F16F 9/34; F16F 9/48; F16K 5/10
[52] U.S. Cl. ..................................... 188/318; 188/314; 188/315; 188/299; 137/493.8; 137/854; 251/208
[58] Field of Search ............... 188/311, 314, 315, 318, 188/299, 285, 322.14; 280/714; 137/512.1, 493.8, 854; 251/208; 267/136, 113

[56] References Cited

U.S. PATENT DOCUMENTS

| | | | |
|---|---|---|---|
| 4,153,237 | 5/1979 | Supalla | 188/314 X |
| 4,275,900 | 6/1981 | Andreoli et al. | 188/314 X |
| 4,515,253 | 5/1985 | Itoh | 188/314 |
| 4,544,130 | 10/1985 | Stoll et al. | 251/208 |

FOREIGN PATENT DOCUMENTS

| | | |
|---|---|---|
| 7503070 | 6/1975 | Fed. Rep. of Germany . |
| 2087829 | 12/1971 | France . |
| 2412756 | 7/1979 | France . |
| 0082990 | 3/1935 | Sweden ............................. 251/208 |
| 0171192 | 11/1921 | United Kingdom ............... 251/208 |

Primary Examiner—Andres Kashnikow
Assistant Examiner—Richard Potosnak
Attorney, Agent, or Firm—Price, Heneveld, Cooper, DeWitt & Litton

[57] ABSTRACT

A hydraulic shock damper comprises a hydraulic cylinder and a piston having apertures and dividing the cylinder in upper and lower chambers. Through a flow channel the upper chamber of the cylinder is connected to a dashpot accomodating a partition element. The space being enclosed between the partition element and the closed end of the dashpot is filled with a pressurized fluid. Spaced around the said cylinder a second cylinder is provided, an open connection between the lower chamber of the first mentioned cylinder and the space between both cylinders being provided. Two branch lines are connected to the flow channel and emerge into a single line which in turn emerges into said space. In each branch line an externally controllable closure means and a non-return valve are arranged. Both non-return valves open in opposing fluid flow directions.

4 Claims, 13 Drawing Figures

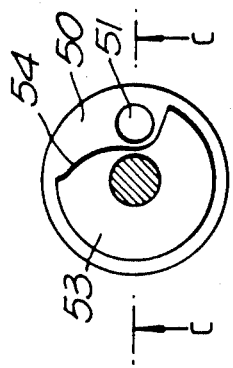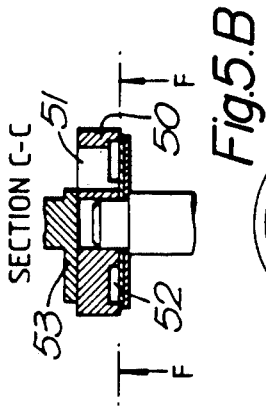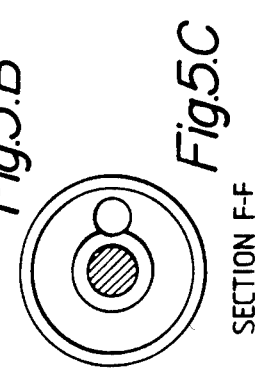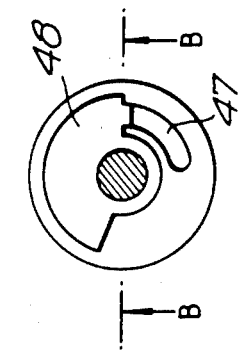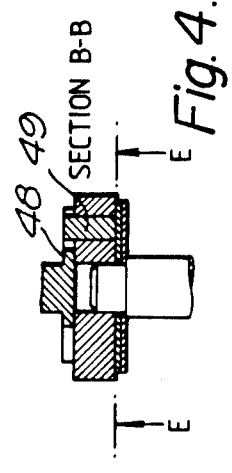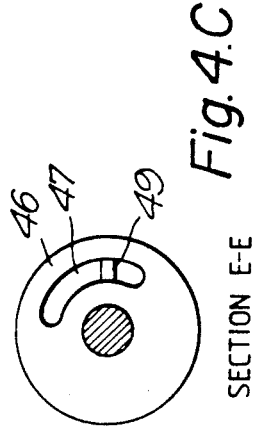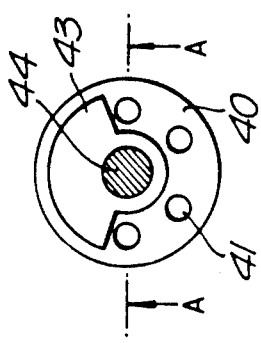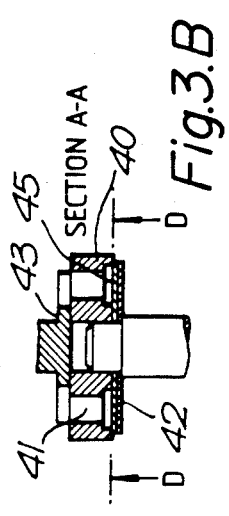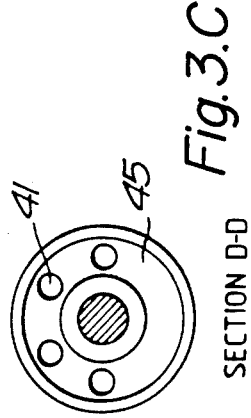

HYDRAULIC SHOCK DAMPER ASSEMBLY FOR USE IN VEHICLES

The invention relates to a hydraulic shock-damper assembly for use in vehicles and in particular for the rear wheel of a motorcycle, such as a rally-cross motorcycle, the shock-damper assembly comprising a hydraulic cylinder accomodating a hydraulic damping fluid and a piston provided with one or more apertures and dividing the cylinder internally to provide upper and lower chambers, and a dashpot closed at one end and a displaceable partitioning element accomodated in the dashpot and in which a first space enclosed between the partitioning element and the closed end of the dashpot is filled with a fluid under pressure and a second space located on the other side of the partitioning element is connected to the upper chamber of the hydraulic cylinder via a transmission channel for the damping fluid.

Such a shock-damper assembly is known per se and is particularly applied as shock-damper for the rear wheel of a rally-cross motorcycle. In this known shock-damper, the channel connecting the hydraulic cylinder's upper chamber to the dashpot is fitted with an adjustable valve by which means the quantity of hydraulic fluid, generally oil, and the so-called damping input of the shock-damper can be regulated. This regulation of the damping input with the aid of the valve is limited however as the result of the relatively small flow of oil displaced via the connecting channel. The so-called damping output is regulated by setting the degree of force exerted by a spring system which imposes a load on one or more closure plates which cover off the holes in the piston. In this known shock-damper, the piston-rod is hollow and in that hollow rod an adjusting spindle is arranged which is connected to the spring system and through which the force imposed by the spring system can be set. Due to the fact that the adjusting mechanism is located in the vicinity of the rear-wheel suspension framework it is difficult to reach said mechanism, at least during the time when the motorcycle is being ridden. Yet another disadvantage of the shock-damper is that due to the location of the adjusting mechanism by means of which the damping output can be regulated, the adjusting mechanism itself becomes fouled-up and is therefore difficult to operate.

It is the object of the invention to eliminate the foregoingly quoted disadvantage and to provide a hydraulic shock-damper assembly in which the adjusting mechanism for the damping output is better accessible, fouls-up less quickly and through which a greater adjustment range is obtained over which the damping input and output can be set.

To this end, the shock-damper assembly of the foregoingly quoted type according to the present invention is characterised in that there is provided a second cylinder being spaced concentrically around the said hydraulic cylinder, an open connecting close to the lower end of the hydraulic cylinder and running between the lower chamber of the cylinder and the intermediate space between both cylinders, two branch lines connected to the transmission channel for the damping fluid flow and emerging into a single line which again emerges into the said intermediate space, an externally controllable closure-means and a non-return-valve being arranged in each one of the said branch lines, both of which non-return-valves open in opposing flow directions of the hydraulic fluid.

In the case of the shock-damper according to the invention both controllable closure means, one for the damping input and one for the damping output, are located in the branch lines of the transmission channel for the damping fluid, which together with this channel are arranged in a housing which is mounted between the double-walled cylinder and the shock-damper's dashpot. Both closure means are operable from the exterior and in consequence can easily be reached by the motorcycle's driver even when the latter is driving. The problem of fouling-up of the operating means is dealt with concurrently. Furthermore, the shock-damper according to the invention has the advantage that the range of adjustment of both the damping input and damping output is increased.

A suitable embodiment of the invention is envisaged in the fact that the controllable closure-means and its associated non-return valve arranged in each of the branch lines form an assembly comprising a disc-like element with a number of apertures arranged axially around an arcuate portion of the disc and emerging on one side of the disc into a common chamber in the form of an annular recess in the disc, at least one spring-loaded plate serving as a non-return valve and which opens and closes respectively the annular chamber dependent on the direction of flow of the hydraulic damping fluid and a control plate of circular-segmental form arranged on the opposite side of the disc and which is rotatable with respect to the disc so that the flow debit of the hydraulic damping fluid can be regulated by rotating the control plate.

By the combination of the controllable closure-means and the non-return valve in a single construction, according to the invention, a productionally-favourable assembly results, which can be easily fitted to the shock-damper. Furthermore, the annular chamber into which the flow-through apertures emerge has the advantage that irrespective of the number of the flow-through apertures being opened by the control plate, the non-return valve is subjected to an equally distributed load.

Other suitable embodiments of an assembly comprising a controllable closure means and its associated non-return valve are indicated in claims 3 and 4.

Some examples of preferred embodiments of the invention are further to be described with reference to the following drawings in which:

FIGS. 3, 4 and 5 show embodiments of combinations of controllable closure means and non-return valves applied in the shock-damper according to the invention and, FIG. 3A shows a first embodiment of a combination of a controllable closure means and a non-return valve applied in the shock-damper according to the invention.

FIG. 3B is a sectional view taken along Plane A—A in FIG. 3A.

FIG. 3C is a sectional view taken along Plane D—D in FIG. 3B.

FIG. 4A shows a second embodiment of a combination of a controllable closure means and a non-return valve applied in the shock-damper according to the invention.

FIG. 4B is a sectional view taken along Plane B—B in FIG. 4A.

FIG. 4C is a sectional view taken along Plane E—E in FIG. 4B.

FIG. 5A shows a third embodiment of a combination of a controllable closure means and a non-return valve applied in the shock-damper according to the invention.

FIG. 5B is a sectional view taken along Plane C—C in FIG. 5A.

FIG. 5C is a sectional view taken along Plane F—F in FIG. 5B.

Figure 1:
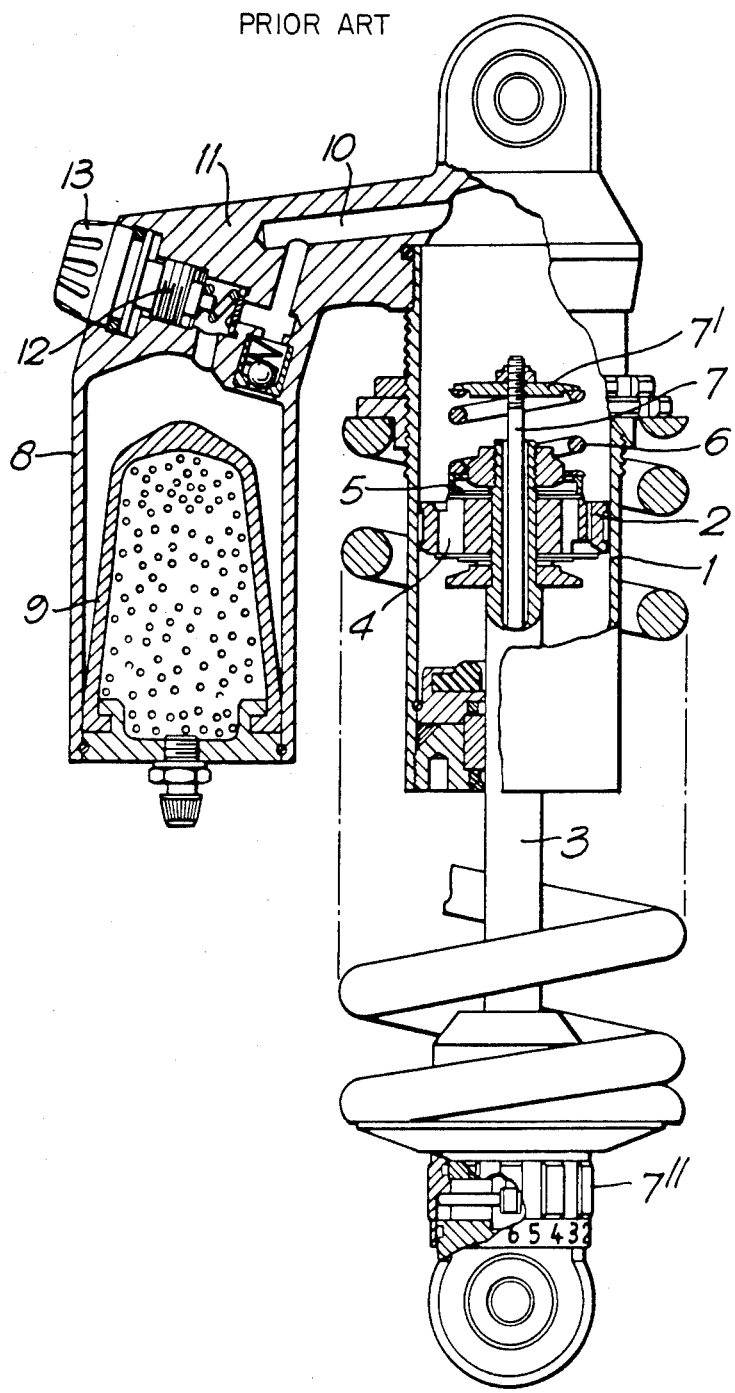
FIG. 1 shows in partial cross-section a hydraulic shock-damper assembly as known from the present state of the art.

The known shock-damper shown in FIG. 1 and which is applied in particular as a shock-damper for the rear-wheel of a rally-cross motorcycle, comprises a cylinder 1 accomodating a hydraulic damping fluid which is generally oil, and also a displacable piston 2 therein which is provided with a hollow piston-rod 3. The cylinder 1 is divided into an upper chamber and a lower chamber whilst the piston 2 is provided with a number of holes 4 which are covered-off with one or more spacer-plates 5 on the side of the piston 2 opposite to that of the piston-rod 3. These spacer-plates 5 serve as valves and are spring-loaded by a compression-spring 6 which rests against the spacer-plates at one of its ends and supports an end-portion 7' of a setting-spindle 7 at the other one of its ends, the setting-spindle 7 extending out from the hollow piston-rod 3. The setting-spindle 7 forms a part of the mechanism for regulating the damping output and which mechanism comprises a setting-nut 7" by which means the position of the setting-spindle 7 can be set with respect to the piston 2 and by which means the force imposed by the compression spring 6 can thus be set also.

As shown in FIG. 1, the known type of shock-damper also includes a dashpot 8 which serves to compensate for the spatial volume occupied by the piston-rod and the lower end of which is closed. This dashpot also accomodates a displacable partitioning element 9 which is in the form of a dome shaped diaphragm. The space between the closed lower end of the dashpot 8 and the partitioning element 9 is filled with a fluid under pressure, an inert gas for example. The space in the dashpot on the other side of the membrane 9 is connected to the upper chamber of the cylinder 1 via a flow-channel 10 which can be constituted by a flexible tube joining the dashpot 8 with the upper chamber of the cylinder 1. In the embodiment shown in FIG. 1 however, the channel 10 is accomodated in a housing 11 which is in turn connected at one end to the dashpot 8 and at the other end to the cylinder 1. A valve 12 is fitted in the channel 10 and the flow passage through the valve is regulated from the exterior by means of an operating knob 13 which sets the damping input of the shock-damper.

Figure 2:
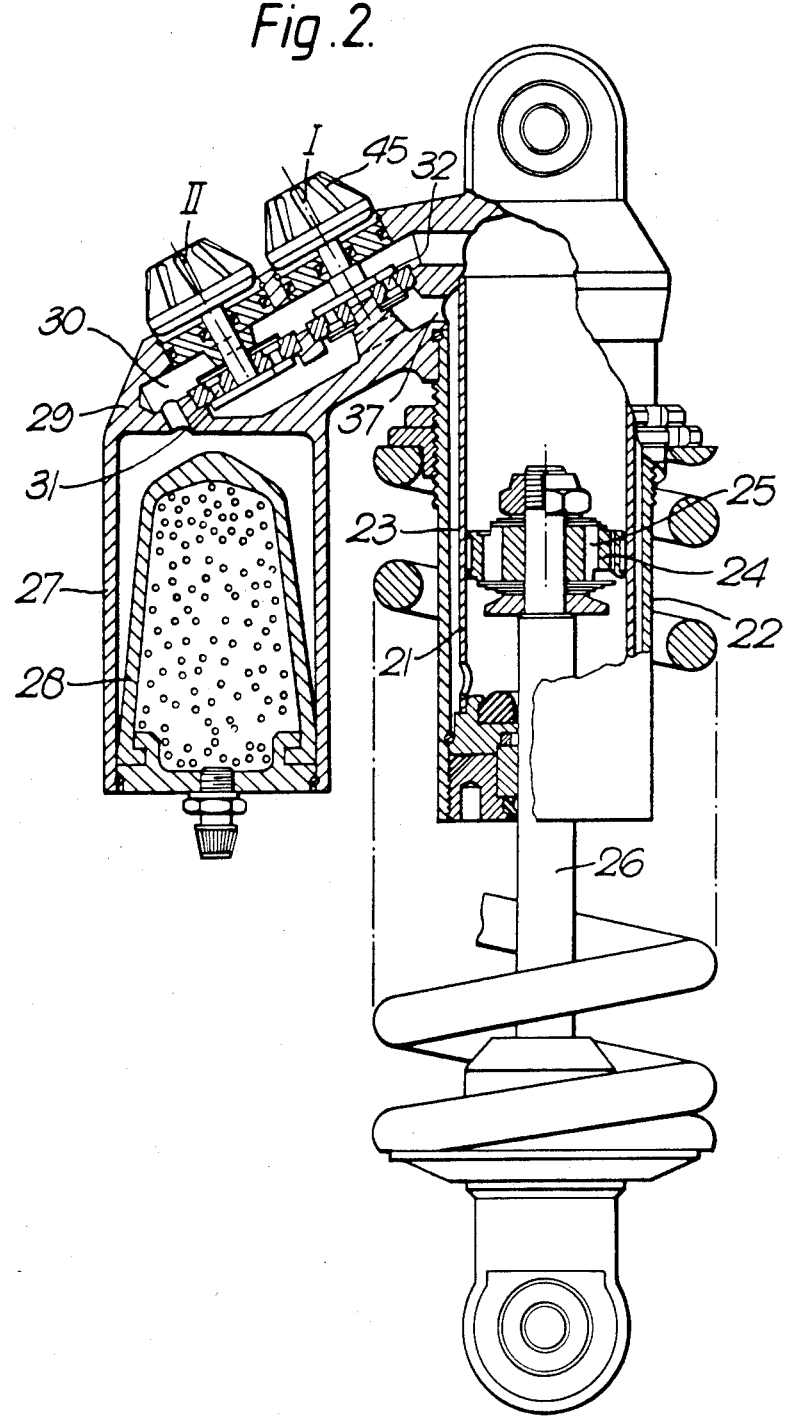
FIG. 2 shows in partial cross-section an embodiment of the hydraulic shock-damper in accordance with the invention.

In part cross-section, FIG. 2 shows an embodiment of the hydraulic shock-damper according to the invention. This fig. shows a cylinder 21 surrounded by a concentrically fitted second cylinder 22 such that a space 23 is provided between both cylinders. Cylinder 21 is fitted with a displaceable piston 24 having a number of holes 25 therethrough and separating the cylinder 21 into upper and lower chambers, this piston 24 being mounted on a solid piston-rod 26. An open connection is provided close to the lower end of the cylinder 21 and running from the latter's lower chamber to the space 23. According to this embodiment of the invention, this embodiment also includes a dashpot 27 accomodating a displaceable partitioning element 28. The space beneath the partitioning element 28 is filled with a fluid, such as nitrogen for example, under a pressure of 14 atmospheres. Between the assembly of cylinders 21, 22 and the dashpot 27 a housing 29 is provided in which a channel 30 is provided that emerges at one end into the dashpot 27 and at its other end into the upper chamber of cylinder 21. Two branch lines 31 and 32 respectively are connected to the channel 30 and merge into a common line 37 which then emerges into the space 23 between the two cylinders 21 and 22. Combination assemblies I and II, each including a closure means and a non-return valve, are fitted in the branch lines 31 and 32 respectively. Embodiments of such assemblies are further to be described with reference to FIGS. 3, 4 and 5. The non-return valves of assemblies I and II are designed in such a manner that they open in opposing directions of the flow of the damping fluid. The operating spindles for the assemblies I and II extend through to the outside of the housing 29 so that the valves are operable from the exterior. When fitted to a motorcycle, the housing 29 is located close to or under the driver's saddle so that, if desired, he can operate both valves whilst riding.

FIG. 3 shows a practical embodiment of a closure means/non-return valve assembly I for example, and which is fitted to the shock-damper according to the invention and shown in FIG. 2. The assembly comprises a disc 40 having a number of axially arranged apertures 41 extending therethrough and distributed over an arc, and which apertures engage at their lower ends with at least one springy plate 42 which serves as a non-return valve. In the embodiment shown in FIG. 3, on the side of the disc where the non-return valve is located the axially arranged apertures 41 emerge into a common chamber 45 in the form of an annular recess in the disc 40. The advantage of this embodiment is that irrespective of the number of flow-through apertures 41 being open, the springy non-return valve is evenly loaded by pressure of the fluid pressure medium applied thereto. On the side of the disc 40 opposing to the plate 42 a control plate 43, of circular-segmental form is affixed to a control spindle 44 which can be turned with the aid of an operating knob 45 (see FIG. 2). Thus the control plate 43 of circular-segmental form is adjustable with respect to the aperture 41 in the disc 40 such that the total number of flow-through apertures in the disc 40 can be adjusted. As it appears from FIG. 2, the assembly II is fitted in a reverse arrangement in the housing 29 but for the rest it is the same as assembly I.

FIG. 2 is illustrative of the operation of the shock-damper according to the invention. The damping action is partially obtained in the conventional manner by the movement of the piston 24 with the apertures 25 therethrough in the oil-filled cylinder 21. In the case of the shock-damper according to the invention, the damping effect is obtained further in the following manner: on the input stroke (with the piston moving upward as in FIG. 2) a higher oil-pressure arises on the upper side of the piston than on the lower side thereof as the result of the resistance-to-flow of the piston. This pressure-difference is used to divert part of the oil such that the oil flows, via the closure means and non-return valve of the assembly I, through the channel 30 to the common line 37 and to the intermediate space 23 and then following to the lower chamber of the cylinder 21. The springy plate 42 of assembly II acting as a non-return valve inhibits the flow of the fluid through the disc 40 of this assembly. On the output stroke (piston movement downward as seen in FIG. 2) the oil flows now through assembly II and the non-return valve of assembly I (plate 42 against disc 40) is closed.

FIGS. 4 and 5 show still other embodiments of combinations of controllable means and non-return valves which can be used in shock-dampers according to the invention. FIG. 4 shows an embodiment in which the disc 46 is provided with a groove-like flow passage 47 into which groove a lip 49 on a rotatable control-plate 48 extends whereby not only the flow-debit of the valve is determined but also the surface area to which pressure is operative on the non-return valve. An advantage of this embodiment is that a continuously variable adjustment can be made. In the embodiment shown in FIG. 5, an axial aperture 51 is provided in a disc-like element 50 which emerges into a chamber 52 in the form of an annular recess on one side of the disc. A partially disc-like control plate 53 being rotatable with respect to disc 50, is bordered on its periphery by a surface 54 bent in such a manner that on rotating the control plate, the flow-through aperture 51 is opened or closed gradually in order to regulate the flow debit of the damping fluid.

Figure 6:
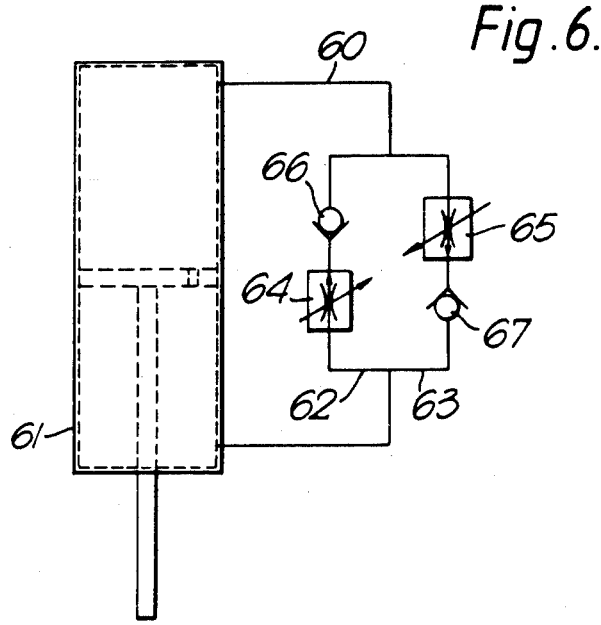
Figure 7:
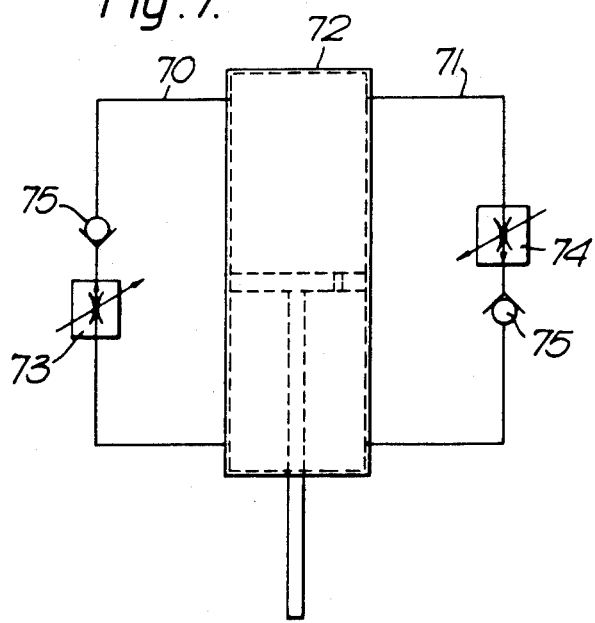

FIGS. 6 and 7 show schematically some modified embodiments of the shock-damper according to the invention. In the case of the embodiment shown in FIG. 6 a main line is provided which emerge at its different ends into the upper and lower chambers respectively of the cylinder 61. Two branch lines 62 and 63 arranged in parallel are incorporated in the line 60 and in which branch lines a valve 64 and a non-return valve 66 are incorporated in branch line 62 and a valve 65 and a non-return valve 67 are incorporated in the branch line 63. In this embodiment also the non-return valves open in opposing directions.

In the embodiment shown in FIG. 7 the shock-damper comprises two lines 70, 71, each of which is emerging into the upper and lower chambers of a cylinder 72. In each line valves 73 and 74 respectively and non-return valves 75 and 76 respectively are mounted, the non-return valve opening again in opposing directions. The schematically shown embodiments in FIGS. 6 and 7, in which no double-walled cylinder is required, are particularly suitable for such applications in which the damper is not encircled by a spring (such as shown in the example of FIG. 2) but where the spring is fitted in some other place such as is often the case with automobiles.

What we claim is:

1. A hydraulic shock-damper assembly for use in vehicles and particularly for the rear wheel of a motorcycle such as a rally-cross motorcycle, the shock-damper assembly comprising a hydraulic cylinder accomodating a hydraulic damping fluid and a piston provided with one or more apertures and dividing the cylinder internally to provide upper and lower chambers, and a dashpot closed at one end and a displaceable partitioning element accomodated in the dashpot and in which a first space enclosed between the partitioning element and the closed end of the dashpot is filled with a fluid under pressure and a second space located on the other side of the partitioning element is connected to the upper chamber of the hydraulic cylinder via a transmission channel for the damping fluid, characterised in that there is provided a second cylinder being spaced concentrically around the said hydraulic cylinder, an open connection close to the lower end of the hydraulic cylinder and running between the lower chamber of the cylinder and the intermediate space between both cylinders, two branch lines connected to the transmission channel for the damping fluid flow and emerging into a single line which again emerges into the said intermediate space, an externally controllable closure means and a non-return valve being arranged in each one of the said branch lines, both of which non-return valves open in opposing flow directions of the hydraulic fluid.

2. A shock-damper assembly as claimed in claim 1, characterised in that the controllable closure means and its associated non-return valve arranged in each of the branch lines constitute an assembly comprising a disc-like member with a number of apertures arranged axially around an arcuate portion of the disc and emerging on one side of the disc into a common chamber in the form of an annular recess in the disc, at least one spring-loaded plate serving as a non-return valve and which opens and closes respectively the annular chamber dependent on the direction of flow of the hydraulic damping fluid and a control plate of circular-segmental form arranged on the opposite side of the disc and which is rotatable with respect to the disc so that the flow debit of the hydraulic damping fluid can be regulated by rotating the control plate.

3. A shock-damper assembly as claimed in claim 1, characterised in that the controllable closure means and its associated non-return valve arranged in each of the branch lines constitute an assembly comprising a disc-like element provided with a groove-like flow-through aperture extending around an arcuate portion thereof, at least one spring-loaded plate serving as a non-return valve and which opens and closes respectively the groove-like aperture dependent on the direction of flow of the hydraulic damping fluid, and a control plate of circular-segmental form arranged on the opposite side of the disc and which is rotatable with respect to the disc so that the flow debit of the hydraulic damping fluid can be regulated, the control plate being provided with a lip which extends into the groove-like flow-through aperture.

4. A shock-damper assembly as claimed in claim 1, characterised in that the controllable closure means and its associated non-return valve arranged in each of the branch lines constitute an assembly comprising a disc-like element provided with an axial flow-through aperture therethrough which emerges on one side of the disc into a common chamber in the form of an annular recess in the disc, at least one spring-loaded plate serving as a non-return valve and which opens and closes respectively the annular chamber dependent on the direction of flow of the hydraulic damping fluid, and a partially disc-like control plate arranged on the other side of the disc and which is rotatable with respect to the disc so that the flow debit of the hydraulic damping fluid can be regulated, the partially disc-like regulating-plate being bordered on its periphery by a surface bent in such a manner that on rotating the control plate the flow-through aperture is gradually opened or closed.

* * * * *

UNITED STATES PATENT AND TRADEMARK OFFICE
CERTIFICATE OF CORRECTION

PATENT NO. : 4,732,244

DATED : March 22, 1988

INVENTOR(S) : Adrianus Henricus Ignatius Verkuylen

It is certified that error appears in the above-identified patent and that said Letters Patent is hereby corrected as shown below:

Column 1, Line 58:
"connecting" should be --connection--.

Column 2, Lines 53-56:
delete "Figs. 3, 4 and 5 show embodiments of combinations of controllable closure means and non-return valves applied in the shock-damper according to the invention and,".

Column 3, Line 12:
insert "Figs. 6 and 7 show in schematical form modifications of the embodiments of the shock-damper according to the invention"

Column 5, Line 41:
"valve" should be --valves--.

Signed and Sealed this

Twentieth Day of September, 1988

Attest:

DONALD J. QUIGG

Attesting Officer

Commissioner of Patents and Trademarks